US010554623B2

(12) United States Patent
Inoue

(10) Patent No.: US 10,554,623 B2
(45) Date of Patent: Feb. 4, 2020

(54) ON-BOARD COMMUNICATION SYSTEM

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Masayuki Inoue, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/763,308

(22) PCT Filed: Sep. 23, 2016

(86) PCT No.: PCT/JP2016/077959
§ 371 (c)(1),
(2) Date: Mar. 26, 2018

(87) PCT Pub. No.: WO2017/057165
PCT Pub. Date: Apr. 6, 2017

(65) Prior Publication Data
US 2018/0288000 A1 Oct. 4, 2018

(30) Foreign Application Priority Data
Sep. 29, 2015 (JP) .................................. 2015-192146

(51) Int. Cl.
*H04L 29/06* (2006.01)
*H04L 29/14* (2006.01)
*H04L 12/40* (2006.01)

(52) U.S. Cl.
CPC .... *H04L 63/0227* (2013.01); *H04L 12/40013* (2013.01); *H04L 29/14* (2013.01);
(Continued)

(58) Field of Classification Search
CPC .................................................. H04L 63/0227
See application file for complete search history.

(56) References Cited

U.S. PATENT DOCUMENTS

2008/0119130 A1* 5/2008 Sinha .................... H04W 12/06
455/1
2011/0041176 A1* 2/2011 Maria .................. H04Q 3/0025
726/13

(Continued)

FOREIGN PATENT DOCUMENTS

JP 2003-204322 A 7/2003
JP 2007-174287 A 7/2007

OTHER PUBLICATIONS

Search Report for PCT/JP2016/077959, dated Dec. 13, 2016.

*Primary Examiner* — John D Blanton
(74) *Attorney, Agent, or Firm* — Honigman LLP

(57) ABSTRACT

Provided is an on-board communication system that can prevent a communication line from being occupied due to repetitive transmission of an unauthorized message. The on-board communication system includes a plurality of interconnected ECUs and a monitoring device including: a determination processing unit to determine whether a message is an authorized message; a discard processing unit to perform processing for discarding an unauthorized message; a storage unit to store the ID of the discarded message; and a notification processing unit to perform processing for outputting, an ACK signal indicating that the reception of the message is complete. The discard processing unit does not discard a message with the same ID as that stored in the storage unit. Each of the ECUs stores the ID added to a (Continued)

message subjected to the discard processing, and prohibits processing of a message with the same ID as that stored in the storage unit.

9 Claims, 10 Drawing Sheets

(52) U.S. Cl.
CPC .... *H04L 63/12* (2013.01); *H04L 2012/40215* (2013.01); *H04L 2012/40273* (2013.01)

(56) References Cited

U.S. PATENT DOCUMENTS

| | | |
|---|---|---|
| 2015/0089236 A1 | 3/2015 | Han et al. |
| 2015/0172298 A1 | 6/2015 | Otsuka |

* cited by examiner

ON-BOARD COMMUNICATION SYSTEM

CROSS-REFERENCE TO RELATED APPLICATIONS

This application is the U.S. national stage of PCT/JP2016/077959 filed Sep. 23, 2016 which claims priority of Japanese Patent Application No. JP 2015-192146 filed Sep. 29, 2015.

TECHNICAL FIELD

The present invention relates to an on-board communication system in which a plurality of communication devices connected to a common communication line transmit and receive messages.

BACKGROUND

Conventionally, a plurality of ECUs (Electronic Control Units) are installed in vehicles, and are connected to each other via a network such as a CAN (Controller Area Network). The plurality of ECUs exchange information via the network and perform individual processes. In recent years, the size of networks in vehicles tends to increase. As an attack against such a vehicular network, for example, injection of a malicious program into an ECU is conceivable. The ECU into which a malicious program has been injected may transmit an unauthorized message to the network of the vehicle, causing the risk that another ECU connected to the network may malfunction, for example.

JP 2013-98719A has proposed a communication system in which message authentication is performed based on a MAC (Message Authentication Code) without changing a CAN protocol. In this communication system, each ECU counts, for each CAN-ID, the number of times when a message is transmitted. A transmission node generates a MAC based on the data field, the CAN-ID, and the count value of a main message, and transmits the generated MAC as a MAC message. A reception node generates a MAC based on the data field, the CAN-ID, and the count value that are contained in the received main message, and determines whether or not the generated MAC matches the MAC contained in the MAC message.

"How to Stop Unauthorized Transmission in Controller Area Network" presented by Hata et al. at the Computer Security Symposium in 2001, has proposed a communication system in which ECUs monitor a message transmitted in a network, and an ECU determines, if a message with a CAN-ID that should be transmitted by it has been transmitted from another ECU, that message as an unauthorized message, and the ECU that has detected the unauthorized message transmits an error frame before the transmission of the unauthorized message is complete to prevent the transmission.

Non-Patent Document 1: Masato Hata, Masato Tanabe, Katsunari Yoshioka, Kazuomi Oishi, and Tsutomu Matsumoto, "How to Stop Unauthorized Transmission in Controller Area Network", Computer Security Symposium, Octover, 2011

In the communication system described in "How to Stop Unauthorized Transmission in Controller Area Network", an ECU that has detected an unauthorized message transmits an error frame to prevent the transmission of the unauthorized message. However, an ECU (unauthorized ECU) that has failed to transmit a message will repeatedly retransmit the message until the message is transmitted without error. If such repetition of retransmission of the message is continued, then there is the risk that the communication line may be occupied and transmission of authorized messages by other ECUs may be impaired.

The present invention was made in view of such circumstances, and it is an object thereof to provide an on-board communication system that can prevent a communication line from being occupied due to repetitive transmission of an unauthorized message.

SUMMARY

According to the present invention, an on-board communication system in which a plurality of communication devices installed in a vehicle are connected to each other via a common communication line includes: a determination unit configured to determine whether or not a message transmitted on the communication line is an authorized message; a discard unit configured to perform processing for discarding any message determined by the determination unit not to be an authorized message, before the transmission of the message is complete; a storage unit configured to store identification information of any message that has been discarded by the discard unit; and a reception completion notification unit configured to output to the communication line, if a message with the same identification information as that stored in the storage unit is received, a signal indicating that reception of the message is complete irrespective of a determination result of the determination unit, wherein the communication devices each include a prohibition unit configured to prohibit processing based on any message with the same identification information as that stored in the storage unit, and the discard unit does not discard messages with the same identification information as that stored in the storage unit.

Furthermore, preferably, the on-board communication system according to the present invention further includes: a memory deletion unit configured to delete the identification information stored in the storage unit if the signal is output by the reception completion notification unit.

Furthermore, preferably, the on-board communication system according to the present invention further includes: a monitoring device that is connected to the communication line, and is configured to monitor a message transmitted on the communication line, the monitoring device including the determination unit, the discard unit, and the storage unit, wherein the communication devices each include the storage unit, and the monitoring device and at least one of the plurality of communication devices include the reception completion notification unit.

Furthermore, preferably, the on-board communication system according to the present invention is such that the communication devices each include the determination unit, the discard unit, and the storage unit, and at least one of the plurality of communication devices includes the reception completion notification unit.

Furthermore, according to the present invention, an on-board communication system in which a plurality of communication device installed in a vehicle are connected to each other via a common communication line includes: a determination unit configured to determine whether or not a message transmitted on the communication line is an authorized message; a discard unit configured to perform processing for discarding any message determined by the determination unit not to be an authorized message, before the transmission of the message is complete; a counter configured to count the number of times when the message is discarded by the discard unit; and a reception completion notification unit configured to output to the communication line, if the number of times counted by the counter exceeds a predetermined number of times, a signal indicating that reception of the message is complete irrespective of a determination result of the determination unit, wherein the communication devices each include a prohibition unit configured to prohibit processing based on any received message if the number of times counted by the counter exceeds the predetermined number of times, and the discard unit does not discard the message if the number of times counted by the counter exceeds the predetermined number of times.

Furthermore, preferably, the on-board communication system according to the present invention further includes: a storage unit configured to store, if a message is discarded by the discard unit, identification information of the discarded message; and an initialization unit configured to initialize the counter if a message with identification information different from the identification information stored in the storage unit is transmitted to the communication line.

Furthermore, preferably, the on-board communication system according to the present invention further includes: an initialization unit configured to initialize the counter if the signal is output by the reception completion notification unit.

Furthermore, preferably, the on-board communication system according to the present invention further includes: a monitoring device that is connected to the communication line, and is configured to monitor a message transmitted on the communication line, the monitoring device including the determination unit, the discard unit, and the counter, wherein the communication devices each include the counter, and the monitoring device and at least one of the plurality of communication devices include the reception completion notification unit.

Furthermore, preferably, the on-board communication system according to the present invention is such that the communication devices each include the determination unit, the discard unit, and the counter, and at least one of the plurality of communication devices includes the reception completion notification unit.

Furthermore, preferably, the on-board communication system according to the present invention is such that the monitoring device is a gateway device that is connected to a plurality of communication lines, and is configured to relay a message between the communication lines.

According to the present invention, the on-board communication system having a configuration in which a plurality of communication devices are connected to each other via a common communication line includes: the determination unit configured to determine whether or not a message is an authorized message; the discard unit configured to discard an unauthorized message before transmission thereof is complete; the storage unit configured to store identification information added to the discarded message; and the reception completion notification unit configured to output, if a message with the same identification information as that stored in the storage unit is received, a signal indicating completion of the reception. Note that the determination unit, the discard unit, the storage unit, and the reception completion notification unit may be provided in each of the communication devices included in the on-board communication system, or may be provided in the monitoring device connected to the communication line.

Each of the communication devices of the on-board communication system does not perform processing based on a message with the same identification information as that stored in the storage unit. Furthermore, the discard unit does not perform the message discarding processing on the message with the same identification information as that stored in the storage unit.

In other words, in the present on-board communication system, an unauthorized message, when transmitted for the first time, is discarded by the discard unit, and the identification information of this discarded message is stored. If, for example, an unauthorized communication device retransmits the unauthorized message regardless of the discard, then, since the identification information added to the retransmitted message is stored in the storage unit, the discard by the discard unit is not performed and a signal indicating completion of reception is output by the reception completion notification unit, but the communication devices do not perform processing based on the unauthorized message. As a result of the signal indicating completion of reception being output, the communication device that has transmitted the unauthorized message determines that the unauthorized message has been received by another communication device, and thus the unauthorized message is no longer retransmitted.

Furthermore, in the present invention, the storage unit in which identification information of a discarded message is stored deletes the stored identification information if the signal indicating completion of reception is output by the reception completion notification unit. Accordingly, it is possible to prevent a situation where processing based on an authorized message with the same identification information as that of the unauthorized message is disabled in each of the ECUs.

Furthermore, in the present invention, the on-board communication system having a configuration in which a plurality of communication devices are connected to each other via a common communication line includes: the determination unit configured to determine whether or not a message is an authorized message; the discard unit configured to discard an unauthorized message before transmission thereof is complete; the counter configured to count the number of times when the message is discarded; and a reception completion notification unit configured to output, if the number of times counted by the counter exceeds a predetermined number of times, a signal indicating completion of reception. Note that the determination unit, the discard unit, the counter, and the reception completion notification unit may be provided in each of the communication devices included in the on-board communication system, or may be provided in the monitoring device connected to the communication line.

Each of the communication devices of the on-board communication system does not perform processing based on a received message if the number of times counted by the counter exceeds the predetermined number of times. Furthermore, the discard unit does not perform the message discarding processing if the number of times counted by the counter exceeds the predetermined number of times.

In other words, in the present on-board communication system, an unauthorized message, if transmitted the predetermined number of times or less, is discarded by the discard unit, and the number of times when that message is discarded is counted by the counter. If, for example, an unauthorized communication device repeatedly retransmits the unauthorized message regardless of the discard and the number of times when the message is discarded exceeds the predetermined number of times, then a signal indicating completion of reception is output by the reception completion notification unit, but the communication devices do not perform processing based on the unauthorized message. As a result of the signal indicating completion of reception being output, the communication device that has transmitted the unauthorized message determines that the unauthorized message has been received by another communication device, and thus the unauthorized message is no longer retransmitted.

Furthermore, in the present invention, the storage unit configured to store identification information added to the message discarded by the discard unit is provided, and the counter is initialized if a message with identification information different from the identification information stored in the storage unit is transmitted to the communication line. Accordingly, only if messages with the same identification information are successively transmitted, the counter can count the number of times.

Furthermore, in the present invention, the counter that counts the number of times when the message is discarded initializes the count value if a signal indicating completion of reception is output by the reception completion notification unit. Accordingly, it is possible to prevent a situation where processing based on an authorized message is disabled in each of the ECUs.

Furthermore, when the present invention is configured such that the monitoring device performs message discarding processing and the like, the monitoring device is preferably a gateway device that relays a message between communication lines. Accordingly, it is possible for the gateway device to perform discard processing and the like on a plurality of communication lines altogether.

According to the present invention, a configuration is such that if, after discarding an unauthorized message, retransmission of the unauthorized message is further repeated, then a signal indicating completion of reception is output without discarding the unauthorized message, and the communication devices do not perform processing based on the message, preventing a communication line from being occupied due to repetitive transmission of an unauthorized message.

DETAILED DESCRIPTION OF PREFERRED EMBODIMENTS

Embodiment 1

Figure 1:
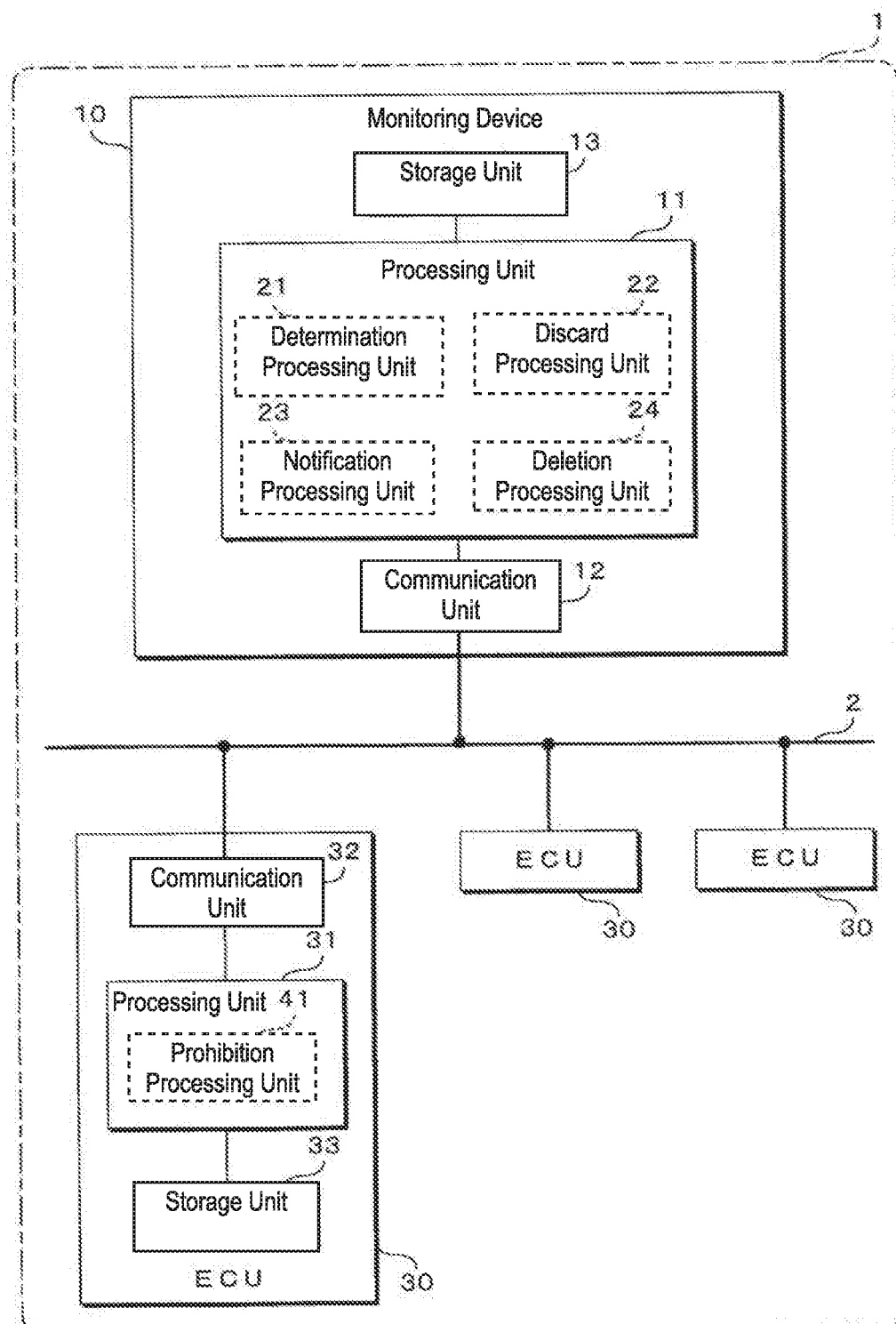
FIG. 1 is a schematic diagram illustrating a configuration of an on-board communication system according to Embodiment 1.

Hereinafter, the present invention will specifically be described with reference to the drawings illustrating embodiments thereof. FIG. 1 is a schematic diagram illustrating a configuration of an on-board communication system according to Embodiment 1. The on-board communication system according to Embodiment 1 has a configuration in which a plurality of ECUs 30 installed in a vehicle 1 are connected to each other via a common communication line 2, and is provided with a monitoring device 10 that monitors a message transmitted and received between the ECUs 30 via the communication line 2.

The monitoring device 10 is configured to include a processing unit 11, a communication unit 12, a storage unit 13, and the like. The processing unit 11 is constituted by an arithmetic processing unit such as a CPU (Central Processing Unit) or an MPU (Micro-Processing Unit), and executes a program stored in a not-shown ROM (Read Only Memory) or the like to perform various types of processing relating to message monitoring.

The communication unit 12 to which the communication line 2 is connected can transmit and receive a message to and from other ECUs 30 via the communication line 2. The communication unit 12 can be constituted by a so-called CAN controller. The communication unit 12 can receive a message by sampling an electric potential of the communication line 2, and give the received message to the processing unit 11, and can also transmit a message to be transmitted that was given from the processing unit 11 by converting the message into an electric signal and outputting the electric signal to the communication line 2. Note that the monitoring device 10 according to the present embodiment does not necessarily transmit and receive a message to and from the ECUs 30, and the communication unit 12 is used to monitor a message that is transmitted and received between the ECUs 30 via the communication line 2.

The storage unit 13 is constituted by a data-rewritable memory device such as an SRAM (Static Random Access Memory) or a DRAM (Dynamic Random Access Memory), for example. The processing unit 11 can store, in the storage unit 13, various types of data such as a received message. Note however that the monitoring device 10 according to the present embodiment monitors a message that is transmitted and received via the communication line 2, and stores, in the storage unit 13, the ID added to any message that was determined as an unauthorized message and was subjected to discard processing.

In the processing unit 11 of the monitoring device 10 according to the present embodiment, a determination processing unit 21, a discard processing unit 22, a notification processing unit 23, a deletion processing unit 24, and the like are realized as functional blocks using software, as a result of execution of a program relating to monitoring processing stored in the ROM or the like. The determination processing unit 21 determines whether or not a message that has been transmitted by an ECU 30 to the communication line 2 is an authorized message. Note that in the present embodiment, the message determining method that is performed by the determination processing unit 21 is not defined. The determination processing unit 21 may be configured to perform determination based on, for example, a MAC or the like added to a message, or may be configured to determine, for example, a message with an ID that is not registered in advance as an unauthorized message. Alternatively, the determination processing unit 21 may be configured to perform determination using a method other than those described above.

The discard processing unit 22 performs processing for causing all of the ECUs 30 connected to the communication line 2 to discard any message that was determined by the determination processing unit 21 as not being an authorized message, that is, as being an unauthorized message. Specifically, the discard processing unit 22 outputs an error frame from the communication unit 12 to the communication line 2 before the transmission of the unauthorized message output to the communication line 2 is complete, so as to cause the ECUs 30 to discard the unauthorized message. When the discard processing unit 22 has performed the discard processing, the processing unit 11 stores the ID added to this unauthorized message as a discard ID in the storage unit 13. Note that in the present embodiment, one ID is stored as a discard ID in the storage unit 13. As a result of the discard processing unit 22 performing the processing for discarding an unauthorized message, the unauthorized message can be prevented from being received by the ECUs 30, making it possible to prevent execution of processing based thereon.

The notification processing unit 23 determines whether or not the ID of the message output to the communication line 2 and the ID stored as a discard ID in the storage unit 13 match each other. If the two IDs match each other, then the notification processing unit 23 gives a notification that reception of this message is complete, regardless of whether or not this message is authorized. Specifically, the notification processing unit 23 outputs an ACK for the transmission of this message to the communication line 2 from the communication unit 12 to notify the originating ECU 30 that has transmitted this message of the fact that reception is complete. Since, as a result of the notification processing unit 23 performing the notification processing, it is possible to notify the originating ECU that has transmitted the unauthorized message of the fact that reception is complete, it is possible to prevent a situation where retransmission of the unauthorized message is continued.

If the ACK is output by the notification processing unit 23, then the deletion processing unit 24 performs processing for deleting, from the storage unit 13, the ID stored as a discard ID in the storage unit 13. As a result of the deletion processing unit 24 deleting the discard ID, it is possible to prevent a situation where processing based on an authorized message with the same ID as the discard ID is disabled in the ECUs 30.

The ECUs 30 (only authorized ECUs 30) included in the on-board communication system according to the present embodiment are each configured to include a processing unit 31, a communication unit 32, a storage unit 33, and the like. The processing unit 31 is constituted by an arithmetic processing unit such as a CPU or an MPU, and performs various types of processing relating to control of the vehicle 1. The communication unit 32 is configured to transmit and receive a message to and from another ECU 30 via the communication line 2, and can be constituted by a so-called CAN controller. The communication unit 32 can receive a message by sampling an electric potential of the communication line 2, and give the received message to the processing unit 31, and can also transmit a message to be transmitted that was given from the processing unit 31 by converting the message into an electric signal and outputting the electric signal to the communication line 2.

Accordingly, an ECU 30 can receive, at the communication unit 32, a message transmitted by another ECU 30 and can perform processing based on the received message at the processing unit 31. Furthermore, the ECU 30 can transmit, as a message, information generated through the processing performed by the processing unit 31 to another ECU 30 from the communication unit 32. For example, if an ECU 30 is an ECU for controlling headlights of the vehicle 1, then the ECU 30 can receive, as a message, information relating to the brightness detected by another ECU 30 using a sensor, and can perform, using the processing unit 31, control processing for switching ON/OFF the headlights based on the brightness information contained in the received message. Note that the processing that is performed by the ECUs 30 based on a received message is not limited to this, and may be any type of processing.

The storage unit 33 is constituted by a data-rewritable memory device such as an SRAM or a DRAM, for example. The processing unit 31 can store various types of control-related data in the storage unit 33. Furthermore, if an error frame is output by the monitoring device 10 before transmission of a message output to the communication line 2 is complete, the ECUs 30 according to the present embodiment discard this message during receiving processing, and stores the ID added to the message as a discard ID in the storage unit 33. Note that in the present embodiment, one ID is stored as a discard ID in the storage unit 33.

In the processing unit 31 of each of the ECUs 30 according to the present embodiment, a prohibition processing unit 41 is realized as a functional block using software, as a result of execution of a program relating to communication processing stored in a ROM or the like. The prohibition processing unit 41 prohibits processing based on a message with the same ID as the discard ID stored in the storage unit 33. Accordingly, if a message with the same ID as the discard ID stored in the storage unit 33 is received by the communication unit 32, the processing unit 31 does not perform processing based on the message. With this, it is possible to prevent processing based on a message with the same ID as that of the message that was determined as unauthorized by the monitoring device 10 and was subjected to discard processing from being performed in the ECUs 30.

Furthermore, if a message with the same ID as the discard ID stored in the storage unit 33 is received by the communication unit 32, then the prohibition processing unit 41 outputs an ACK to give a notification that the reception is complete, and performs processing of deleting the discard ID stored in the storage unit 33. (In other words, the prohibition processing unit 41 performs substantially the same processing as those performed by the notification processing unit 23 and the deletion processing unit 24 of the monitoring device 10.)

Figure 2:
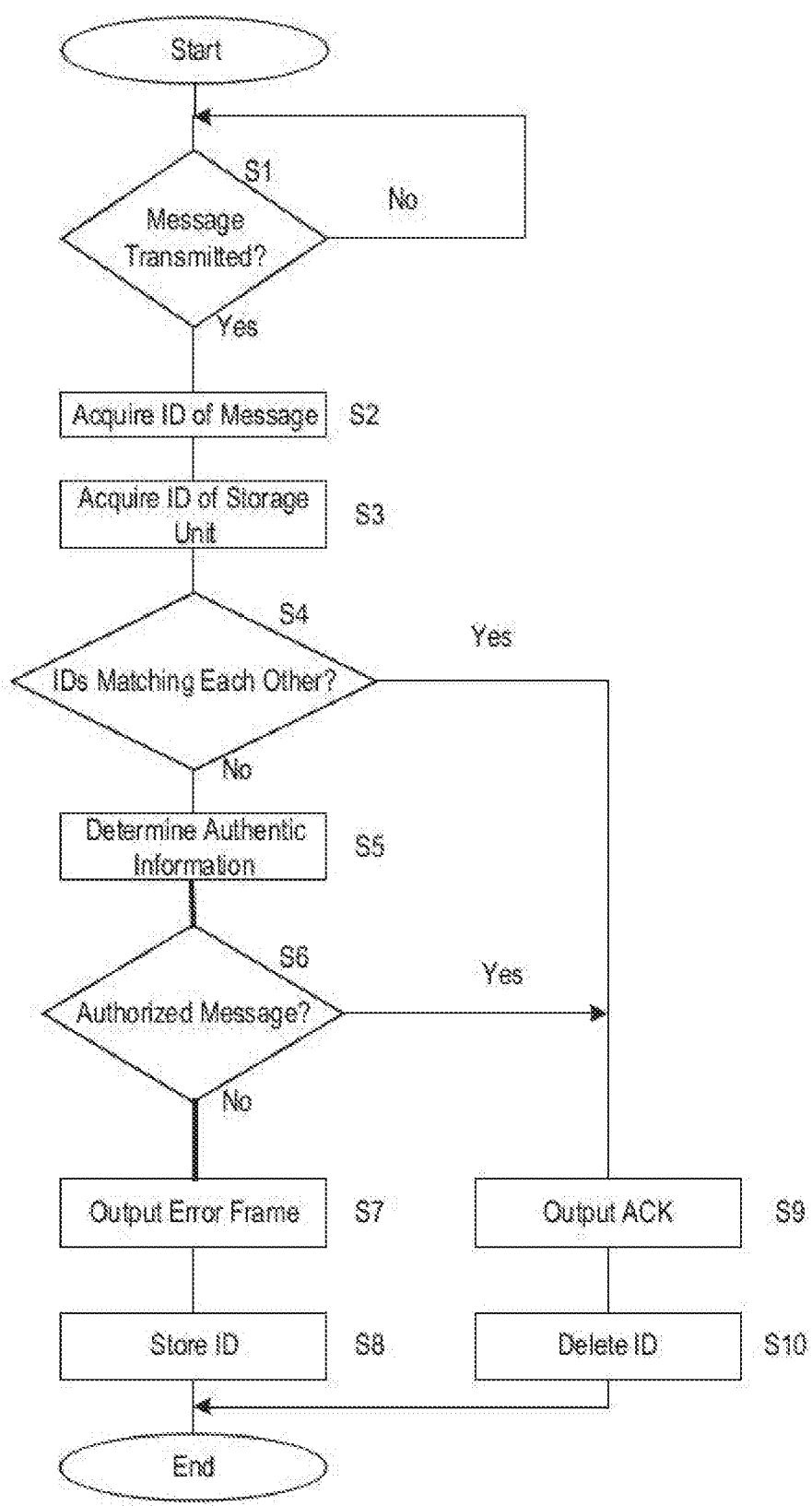
FIG. 2 is a flowchart illustrating a procedure of monitoring processing that is performed by a monitoring device according to the present embodiment.

FIG. 2 is a flowchart illustrating a procedure of the monitoring processing performed by the monitoring device 10 according to the present embodiment. The processing unit 11 of the monitoring device 10 of the present embodiment determines whether or not a message has been transmitted by an ECU 30 to the communication line 2 (step S1). If no message has been transmitted (No in step S1), the processing unit 11 stands by until a message is transmitted by an ECU 30. If a message has been transmitted by an ECU 30 (Yes in step S1), the processing unit 11 acquires the ID of the message at the stage at which the ID of the message is output to the communication line 2 (step S2). The processing unit 11 also acquires the ID stored as a discard ID in the storage unit 13 (step S3). Note here that the processing unit 11 does not need to acquire an ID if no discard ID is stored in the storage unit 13.

The processing unit 11 determines whether or not the ID acquired in step S2 and the ID acquired in step S3 match each other (step S4). Note that if no discard ID could be acquired in step S3, then the processing unit 11 needs only to determine in step S4 that the IDs do not match each other. If the two IDs do not match each other (No in step S4), then the determination processing unit 21 of the processing unit 11 acquires authentication information (MAC) contained in the message at the stage at which the authentication information is output to the communication line 2, and performs determination as to whether or not the acquired authentication information is authorized (step S5), determining whether or not the message that is being transmitted to the communication line 2 is an authorized message (step S6). Note that in this flowchart, the configuration is such that authentication information is added to a message, and whether or not the message is authorized is performed based on the authentication information, but this is just an example and determination of whether or not a message is authorized may also be performed using a method other than the method based on authentication information.

If it is determined by the determination processing unit 21 that the message that is being transmitted to the communication line 2 is not an authorized message (No in step S6), the discard processing unit 22 of the processing unit 11 outputs an error frame to the communication line 2 before the transmission of the message is complete (step S7), and causes the ECUs 30 to discard the message. Then, the processing unit 11 stores the ID of the message as a discard ID in the storage unit 13 (step S8), and ends the procedure.

If it is determined by the determination processing unit 21 that the message that is being transmitted to the communication line 2 is an authorized message (Yes in step S6), the notification processing unit 23 of the processing unit 11 outputs an ACK to the communication line 2 (step S9) to give a notification that the message reception is complete. Then, the processing unit 11 deletes the ID stored as a discard ID in the storage unit 13 (step S10), and ends the procedure.

Figure 3:
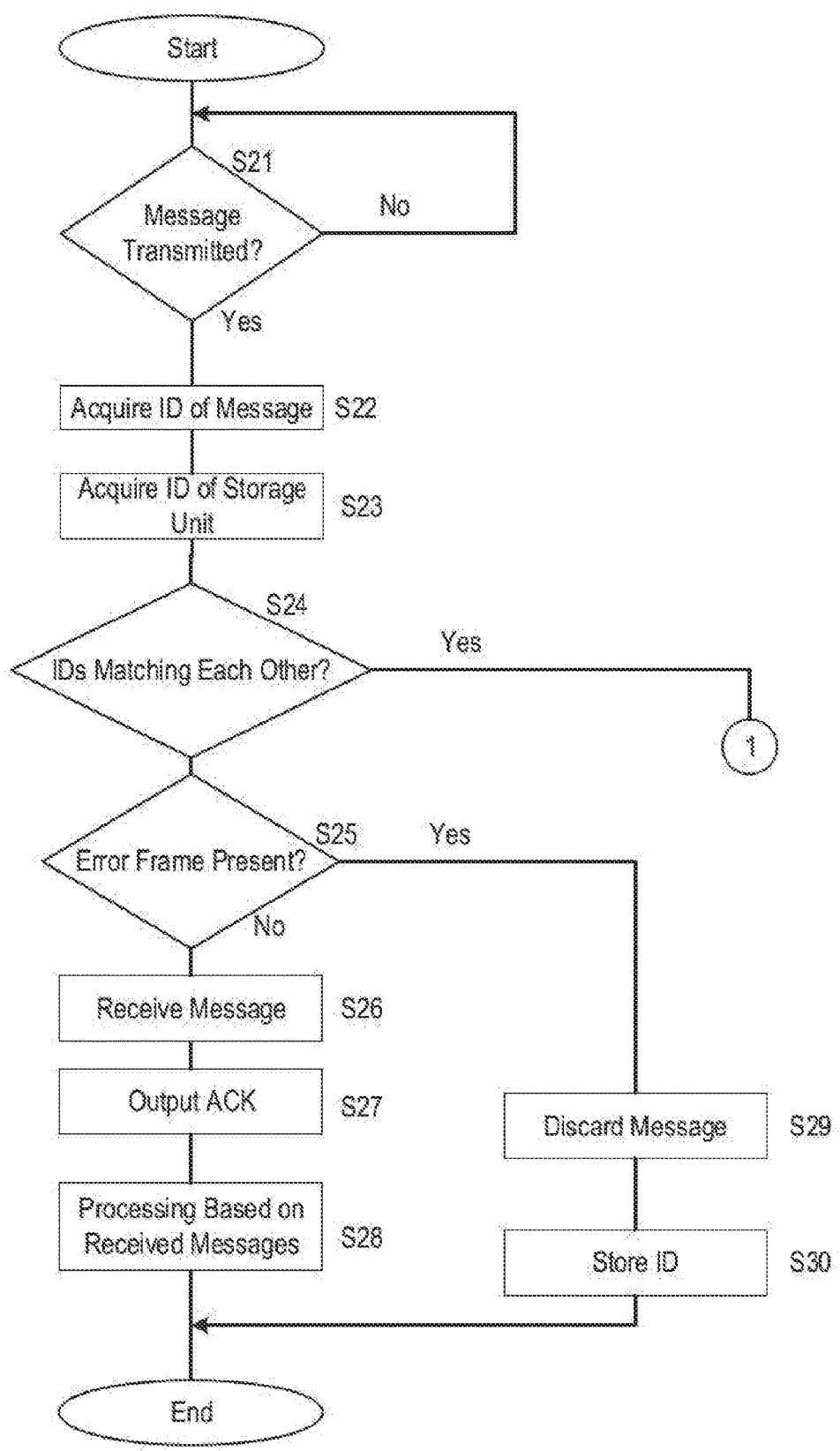
FIG. 3 is a flowchart illustrating a procedure of receiving processing that is performed by each ECU according to the present embodiment.
Figure 4:
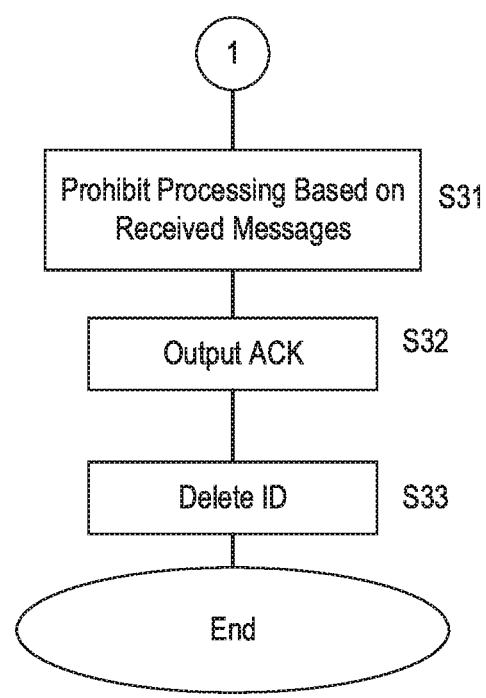
FIG. 4 is a flowchart illustrating the procedure of the receiving processing that is performed by each ECU according to the present embodiment.

FIGS. 3 and 4 show flowcharts illustrating a procedure of the receiving processing performed by each of the ECUs 30 according to the present embodiment. The processing unit 31 of an ECU 30 according to the present embodiment determines whether or not a message has been transmitted by another ECU 30 to the communication line 2 (step S21). If no message has been transmitted (No in step S21), the processing unit 31 stands by until a message is transmitted by another ECU 30. If a message has been transmitted by another ECU 30 (Yes in step S21), the processing unit 31 acquires the ID of the message at the stage at which the ID of the message is output to the communication line 2 (step S22). The processing unit 31 also acquires the ID stored as a discard ID in the storage unit 33 (step S23). Note here that the processing unit 31 does not need to acquire an ID if no discard ID is stored in the storage unit 33.

The processing unit 31 determines whether or not the ID acquired in step S22 and the ID acquired in step S23 match each other (step S24). Note that if no discard ID could be acquired in step S23, then the processing unit 31 needs only to determine in step S24 that the IDs do not match each other. If the two IDs do not match each other (No in step S24), then the processing unit 31 determines whether or not an error frame has been received before the transmission of the message is complete (step S25). If no error frame has been received (No in step S25), then the processing unit 31 receives the message output to the communication line 2 (step S26). The processing unit 31 outputs an ACK to the communication line 2 (step S27) to give a notification that the message reception is complete. Then, the processing unit 31 performs processing based on the received message (step S28), and ends the procedure.

If an error frame has been received before the transmission of the message to the communication line 2 is complete (Yes in step S25), then the processing unit 31 interrupts the processing of receiving the message, and discards the message (step S29). Furthermore, the processing unit 31 stores the ID of the message as a discard ID in the storage unit 33 (step S30), and ends the procedure.

Furthermore, if the ID acquired in step S22 and the ID acquired in step S23 match each other (Yes in step S24), the prohibition processing unit 41 of the processing unit 31 prohibits processing based on the received message (step S31). The processing unit 31 outputs an ACK to the communication line 2 (step S32) to give a notification that the message reception is complete. Then, the processing unit 31 deletes the ID stored as a discard ID in the storage unit 33 (step S33), and ends the procedure.

The on-board communication system according to Embodiment 1 having the above-described configuration is an on-board communication system in which a plurality of ECUs 30 are connected to each other via a common communication line 2 and that is configured to be provided with the monitoring device 10 including: the determination processing unit 21 that determines whether or not a message is authorized; the discard processing unit 22 that performs processing for discarding an unauthorized message before transmission of the message is complete; the storage unit 13 that stores the ID of the discarded message; and the notification processing unit 23 that performs, if a message with the same ID as that stored in the storage unit 13 is received, processing of outputting an ACK signal indicating completion of the reception. Note that the discard processing unit 22 does not discard a message with the same ID as that stored as a discard ID in the storage unit 13. Furthermore, the ECUs 30 do not perform processing based on an unauthorized message such that the storage unit 33 storing, as a discard ID, the ID added to a message subjected to the discard processing by the monitoring device 10 and the prohibition processing unit 41 prohibiting processing based on a message with the same ID as that stored in the storage unit 33.

In other words, in the on-board communication system according to the present embodiment, when an unauthorized message is transmitted for the first time, the message is discarded by the discard processing unit 22 of the monitoring device 10, and, at that time, the ID of the discarded message is stored in the monitoring device 10 and the ECUs 30. If, for example, an unauthorized ECU retransmits the unauthorized message regardless of the discarding of the message, then, since the ID added to the retransmitted message is stored in the monitoring device 10 and the ECUs 30, the discard by the discard processing unit 22 of the monitoring device 10 is not performed and an ACK signal indicating completion of reception is output by the notification processing unit 23, but in the ECUs 30, processing based on the unauthorized message is prohibited and disabled. As a result of the ACK signal indicating completion of reception of an unauthorized message being output, the unauthorized ECU that has transmitted the unauthorized message determines that this message has been received by another ECU 30, and thus the unauthorized message is no longer retransmitted.

Furthermore, when an ACK signal indicating completion of reception is output by the notification processing unit 23, the deletion processing unit 24 of the monitoring device 10 deletes the ID stored as a discard ID in the storage unit 13. Similarly, the ECUs 30 delete the ID stored in the storage unit 33 upon receiving a message with the same ID as that stored as a discard ID in the storage unit 33. Accordingly, it is possible to prevent a situation where processing based on an authorized message with the same ID as that of an unauthorized message is disabled in the ECUs 30.

Note that in the present embodiment, the monitoring device 10 is configured such that the processing unit 11 performs the respective processes of the determination processing unit 21, the discard processing unit 22, the notification processing unit 23, and the deletion processing unit 24, but the present invention is not limited to this, and a configuration is also possible in which, for example, the communication unit 12 performs these processes. In this case, the storage unit 13 may be configured to be accessible directly by the communication unit 12, or may be provided within the communication unit 12. Similarly, the ECUs 30 are configured such that the processing unit 31 performs processing of the prohibition processing unit 41, but the present invention is not limited to this, and a configuration is also possible in which the communication unit 32 performs the processing, for example.

Furthermore, the present embodiment is configured such that the ECUs 30 included in the on-board communication system of the vehicle 1 perform communication conforming to a CAN protocol, but the present invention is not limited to this. It is also possible to configure such that the ECUs 30 perform communication conforming to a protocol other than the CAN protocol, for example, a protocol such as TCP/IP or FlexRay. Furthermore, description has been given taking the on-board communication system installed in the vehicle 1 as an example, but the present invention is not limited to this, and the present technology may also be applied to an on-board communication system installed in an object other than a vehicle, for example, to an on-board communication system that is installed in a mobile object such as an airplane or ship, or an on-board communication system that is placed in a factory or an office. Furthermore, the above-described embodiment has a configuration in which the monitoring device 10, which performs the respective processes of the determination processing unit 21, the discard processing unit 22, the notification processing unit 23, and the deletion processing unit 24, is provided separate from the ECUs 30, but the present invention is not limited to this. For example, as shown in Modification 1 below, a configuration is also possible in which the ECUs 30 perform the respective processes of the determination processing unit 21, the discard processing unit 22, the notification processing unit 23, and the deletion processing unit 24.

Modification 1

Figure 5:
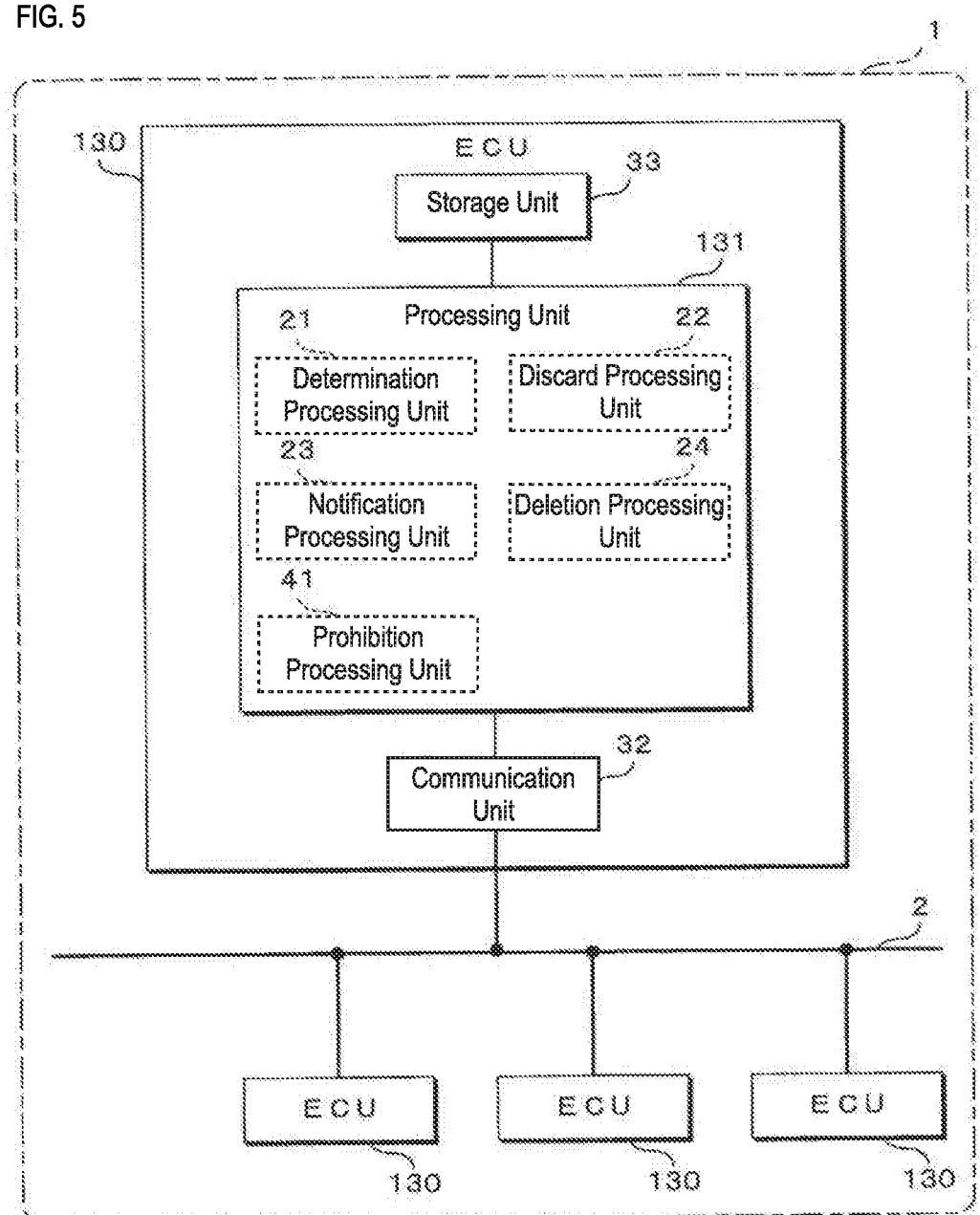
FIG. 5 is a block diagram illustrating a configuration of an on-board communication system according to Modification 1.

FIG. 5 is a block diagram illustrating a configuration of an on-board communication system according to Modification 1. The on-board communication system according to Modification 1 is configured not to include the monitoring device 10 that monitors a message transmitted and received on the communication line 2, but ECUs 130 connected to the communication line 2 monitor a message. As a result of each ECU 130 executing a predetermined program stored in a ROM or the like, the determination processing unit 21, the discard processing unit 22, the notification processing unit 23, the deletion processing unit 24, the prohibition processing unit 41, and the like are realized in a processing unit 131 as functional blocks using software. Processes that are performed by these functional blocks are substantially the same as those of the above-described monitoring device 10 and the ECUs 30 of Embodiment 1.

In other words, in each of the ECUs 130 according to Modification 1, the determination processing unit 21 determines whether or not a message transmitted by another ECU 130 to the communication line 2 is an authorized message. Here, the determination processing unit 21 may be configured to perform determination such that, for example, if a message with an ID that should be transmitted by it has been transmitted by another ECU 130, the message is an unauthorized message, or may be configured to perform determination based on, for example, authentication information added to a message. Alternatively, the determination processing unit 21 may be configured to perform determination using a method other than those methods. If it is determined by the determination processing unit 21 that the message is an unauthorized message, then the discard processing unit 22 of the ECU 130 performs processing of outputting an error frame to the communication line 2 before the transmission of the message is complete so as to cause the other ECUs 130 to discard the unauthorized message. The processing unit 131 of the ECU 130 stores, if the discard processing unit 22 thereof has discarded the message and if the message has been discarded due to the error frame output by another ECU 130, the ID added to the message as a discard ID in the storage unit 33.

Furthermore, if the ID of a message transmitted on the communication line 2 matches the discard ID stored in the storage unit 33, then the notification processing unit 23 of the ECU 130 outputs an ACK signal to the communication line 2 to notify the originating ECU that has transmitted this message of the fact that reception is complete. Note however that the prohibition processing unit 41 of the ECU 130 prohibits processing based on a message with the ID that matches the discard ID stored in the storage unit 33, and thus processing based on the unauthorized message is disabled in the processing unit 131 of the ECU 130. If the notification processing unit 23 has output an ACK signal, the deletion processing unit 24 of the ECU 130 deletes the ID stored as a discard ID in the storage unit 33.

As described above, the on-board communication system according to Modification 1 has a configuration in which each of the ECUs 130 includes the determination processing unit 21, the discard processing unit 22, the notification processing unit 23, the deletion processing unit 24, and the prohibition processing unit 41, and thus it is possible to prevent an unauthorized ECU from repeatedly retransmitting an unauthorized message.

Modification 2

Figure 6:
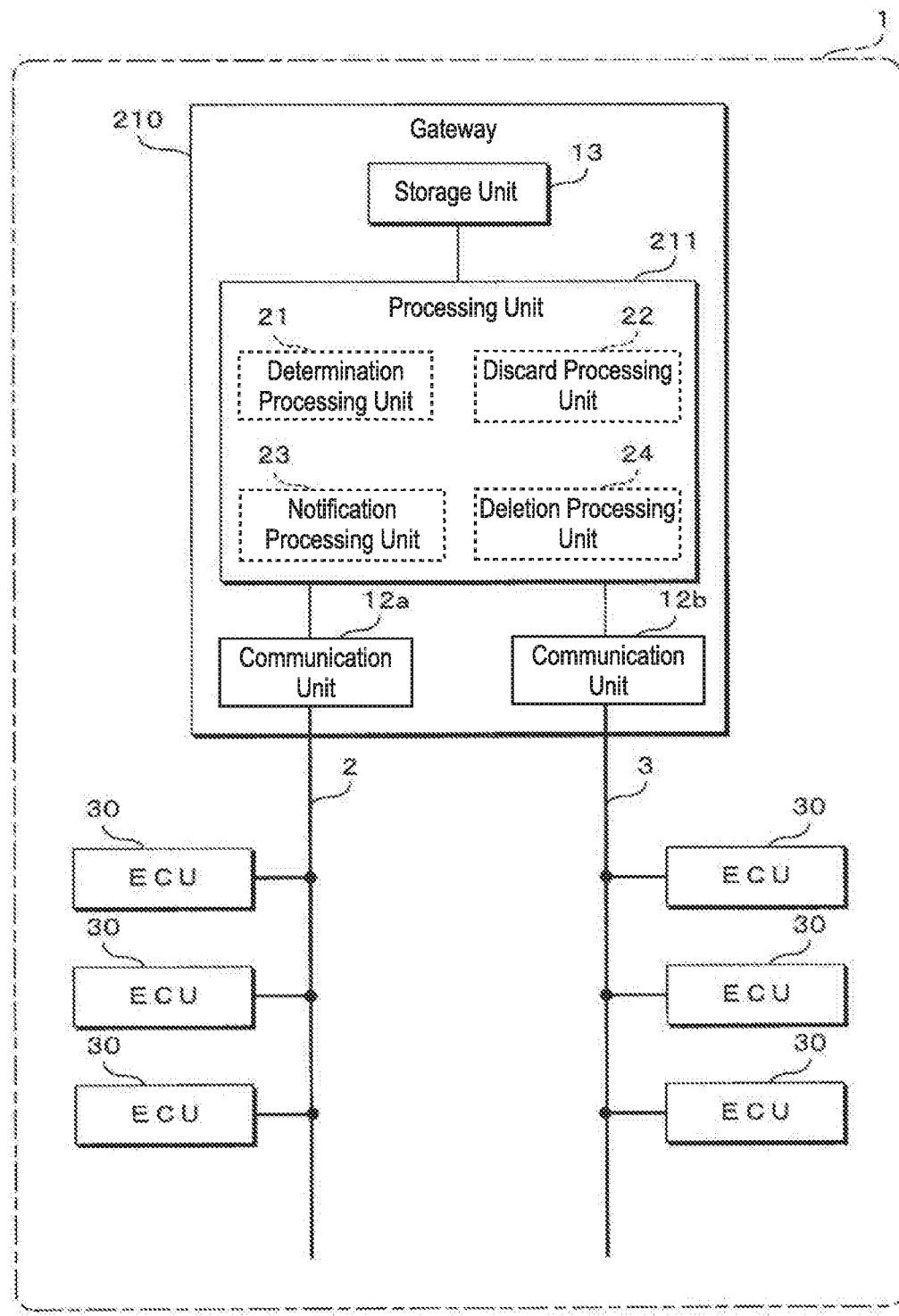
FIG. 6 is a block diagram illustrating a configuration of an on-board communication system according to Modification 2.

FIG. 6 is a block diagram illustrating a configuration of an on-board communication system according to Modification 2. The on-board communication system according to Modification 2 has a configuration in which a communication line 2 and a communication line 3 to each of which a plurality of ECUs 30 are connected are connected to a gateway 210, and the gateway 210 relays a message between the communication lines 2 and 3. In this configuration, it is possible to provide the gateway 210 with a monitoring function similar to that of the monitoring device 10 of the above-described Embodiment 1.

The gateway 210 according to Modification 2 is configured to include a processing unit 211, communication units 12a and 12b, and the storage unit 13. The two communication units 12a and 12b to which the communication lines 2 and 3 are respectively connected transmit and receive a message between the ECUs 30 via the connected communication lines 2 and 3. The processing unit 211 performs processing of relaying a message between the communication lines 2 and 3 by receiving the message at either one of the communication units 12a and 12b and transmitting it from the other one. Furthermore, in the processing unit 211, the determination processing unit 21, the discard processing unit 22, the notification processing unit 23, the deletion processing unit 24, and the like are realized as functional blocks using software, as a result of execution of a predetermined program stored in a ROM or the like. The processes performed by these functional blocks are substantially the same as those of the above-described monitoring device 10 of Embodiment 1, but message monitoring processing is performed individually on the two communication lines 2 and 3.

As described above, in the on-board communication system according to Modification 2, the gateway 210 to which a plurality of communication lines 2 and 3 are connected has the message monitoring function. Accordingly, the gateway 210 can monitor a message in a concentrated manner, and it is possible to achieve a downsized and low-cost on-board communication system as compared to a configuration in which the communication lines 2 and 3 are respectively provided with the monitoring devices 10.

Embodiment 2

Figure 7:
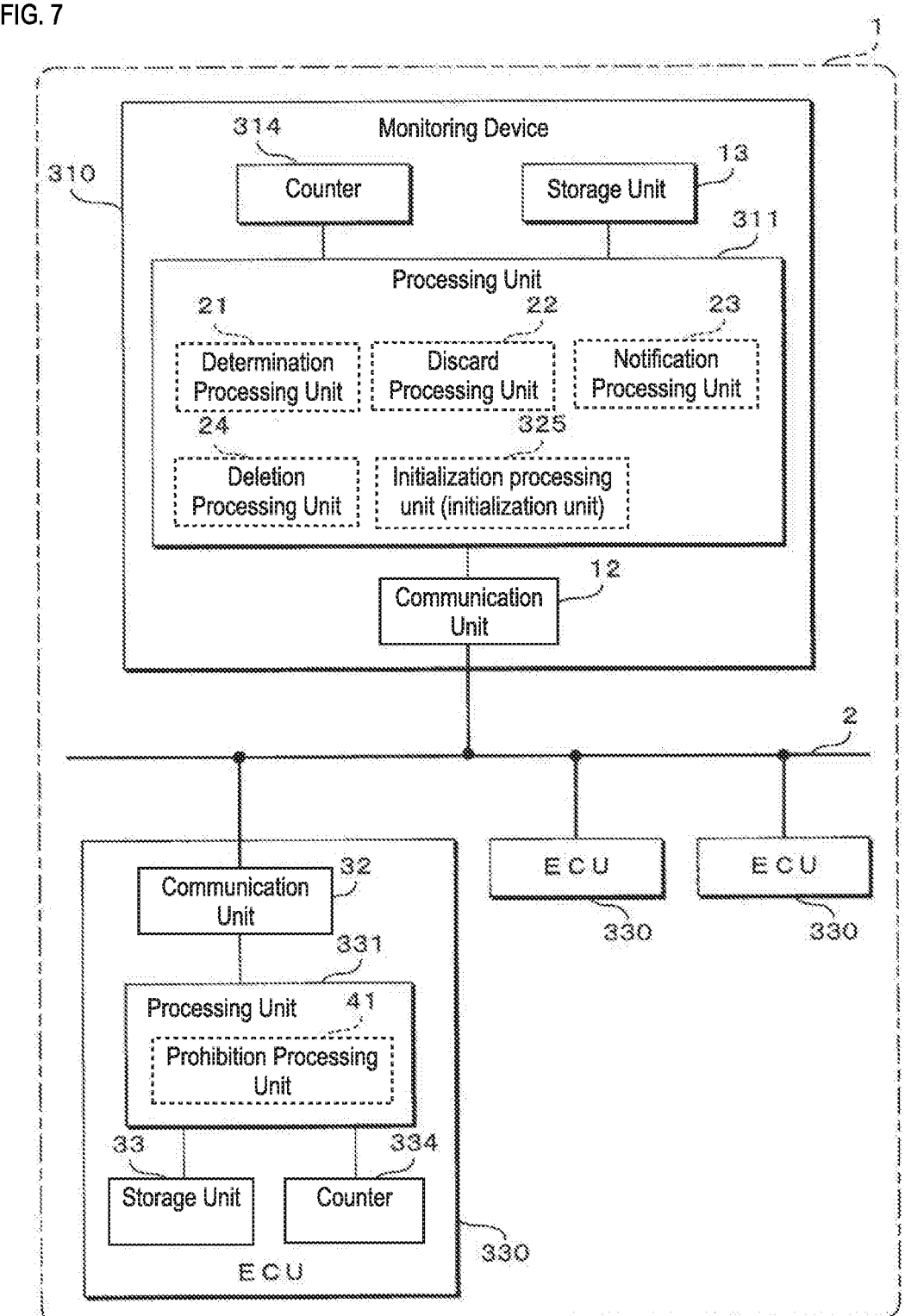
FIG. 7 is a block diagram illustrating a configuration of an on-board communication system according to Embodiment 2.

FIG. 7 is a block diagram illustrating a configuration of an on-board communication system according to Embodiment 2. Similar to the on-board communication system according to Embodiment 1, the on-board communication system according to Embodiment 2 has a configuration in which a plurality of ECUs 330 installed in the vehicle 1 are connected to each other via the common communication line 2, and is provided with a monitoring device 310 that monitors a message transmitted and received by the ECUs 330 via the communication line 2.

The monitoring device 310 is configured to include a processing unit 311, the communication unit 12, the storage unit 13, a counter 314, and the like. The processing unit 311 is constituted by an arithmetic processing unit such as a CPU or a MPU, and executes a program stored in a not-shown ROM or the like to perform various types of processing relating to message monitoring. The counter 314 is a circuit for storing a numeric value, and is configured to increment (count up) the stored numeric value in accordance with an addition instruction given by the processing unit 311, and initialize the stored numeric value to 0 in accordance with an initialization instruction. In Embodiment 2, the counter 314 counts the number of times when a message is determined as unauthorized and is discarded.

In the processing unit 311 of the monitoring device 310 according to Embodiment 2, the determination processing unit 21, the discard processing unit 22, the notification processing unit 23, the deletion processing unit 24, an initialization processing unit 325, and the like are realized as functional blocks using software, as a result of execution of a program relating to monitoring processing stored in a ROM or the like. The determination processing unit 21 determines whether or not a message transmitted by an ECU 330 to the communication line 2 is an authorized message.

If it is determined by the determination processing unit 21 that the message is not an authorized message, then the discard processing unit 22 performs processing of outputting an error frame to the communication line 2 before the transmission of the message is complete to cause the ECUs 330 to discard the unauthorized message. If the discard processing is performed by the discard processing unit 22, then the processing unit 311 stores the ID added to the unauthorized message as a discard ID in the storage unit 13, and counts up the counter 314.

Then, if a message is transmitted to the communication line 2, then the processing unit 311 determines whether or not the ID of the message matches the discard ID stored in the storage unit 13. If the two IDs do not match each other, then the processing unit 311 determines that the unauthorized message is not retransmitted, and the initialization processing unit 325 of the processing unit 311 initializes the counter 314 and the deletion processing unit 24 deletes the discard ID stored in the storage unit 13. If the two IDs match each other, then the processing unit 311 determines whether or not the numeric value stored in the counter 314 exceeds a predetermined number. If the numeric value of the counter 314 does not exceed the predetermined number, then, determination of whether or not the message is an authorized message is performed by the processing unit 21, and the processing of discarding an unauthorized message is performed by the discard processing unit 22, as described above.

If the numeric value of the counter 314 exceeds the predetermined number, then the notification processing unit 23 outputs an ACK for transmission of the message to the communication line 2 using the communication unit 12, irrespective of whether or not the message is authorized, so as to notify the originating ECU that has transmitted the message of the fact that reception is complete. If an ACK is output by the notification processing unit 23, then the deletion processing unit 24 performs processing for deleting, from the storage unit 13, the ID stored as a discard ID in the storage unit 13. Similarly, here, the initialization processing unit 325 performs processing for initializing the counter 314.

The ECUs 330 included in the on-board communication system according to Embodiment 2 are each configured to include: a processing unit 331, a communication unit 32, a storage unit 33, a counter 334, and the like. The processing unit 331 is constituted by an arithmetic processing unit such as a CPU or an MPU, and performs various types of processing relating to control of the vehicle 1. In the processing unit 331 of each of the ECUs 330 of Embodiment 2, the prohibition processing unit 41 is realized as a functional block using software, as a result of execution of a program relating to communication processing stored in a ROM or the like. The counter 334 is a circuit for storing a numeric value, and is configured to count up the stored numeric value in accordance with an addition instruction given by the processing unit 331, and initialize the stored numeric value to 0 in accordance with an initialization instruction.

The processing unit 331 of each of the ECUs 330 according to Embodiment 2 stores, if a message transmitted on the communication line 2 is discarded in accordance with an error frame output from the monitoring device 310, the ID added to this message in the storage unit 33. The prohibition processing unit 41 prohibits processing based on a message added with the same ID as the discard ID stored in the storage unit 33. Then, if a message is transmitted to the communication line 2, the processing unit 331 determines whether or not the ID of this message matches the discard ID stored in the storage unit 33. If the two IDs do not match each other, then the processing unit 331 determines that the unauthorized message is not retransmitted, initializes the counter 334, and deletes the discard ID stored in the storage unit 33. If the two IDs match each other, then the processing unit 331 determines whether or not the numeric value stored in the counter 334 exceeds a predetermined number. Note that the predetermined number with which the ECU 330 compares the number of the counter 334 is the same value as the predetermined number with which the monitoring device 310 compares the number of the counter 314. If the numeric value of the counter 334 does not exceed the predetermined number, then the processing unit 331 performs normal processing for receiving a message (note however that this message may be discarded by the monitoring device 310).

If the numeric value of the counter 334 exceeds the predetermined number, then the processing unit 331 outputs an ACK for transmission of this message to the communication line 2 using the communication unit 32, so as to notify the originating ECU that has transmitted the message of the face that reception is complete. At this time, the processing unit 331 performs processing of deleting the ID stored as a discard ID in the storage unit 33, and initializing the counter 334.

Figure 8:
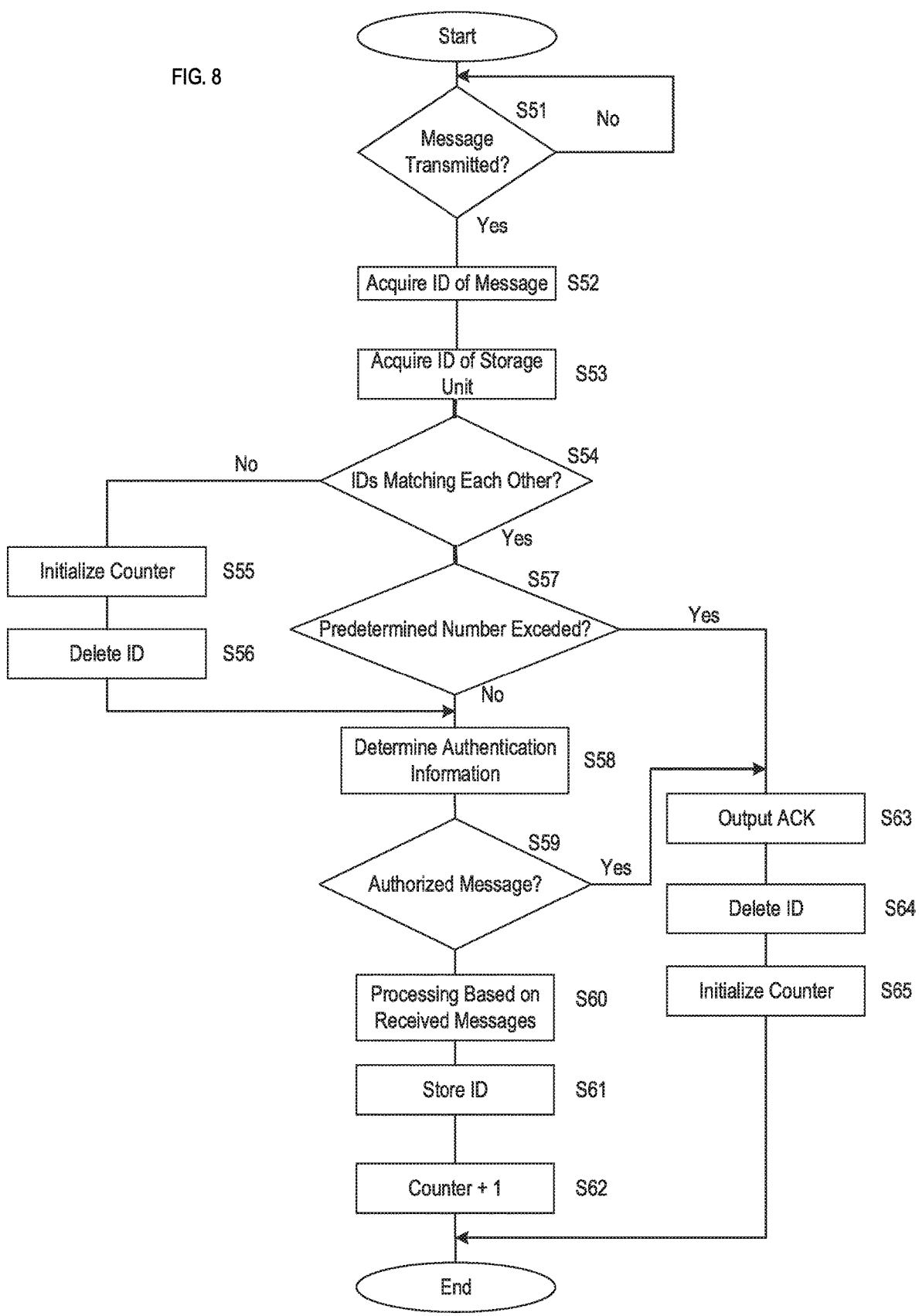
FIG. 8 is a flowchart illustrating a procedure of monitoring processing that is performed by a monitoring device according to Embodiment 2.

FIG. 8 is a flowchart illustrating a procedure of monitoring processing performed by the monitoring device 310 according to Embodiment 2. The processing unit 311 of the monitoring device 310 according to Embodiment 2 determines whether or not a message has been transmitted by an ECU 330 to the communication line 2 (step S51). If no message has been transmitted (No in step S51), the processing unit 311 stands by until a message is transmitted by an ECU 330. If a message has been transmitted by an ECU 330 (Yes in step S51), the processing unit 311 acquires the ID of the message at the stage at which the ID of the message is output to the communication line 2 (step S52). The processing unit 311 also acquires the ID stored as a discard ID in the storage unit 13 (step S53). Note here that the processing unit 11 does not need to acquire an ID if no discard ID is stored in the storage unit 13.

The processing unit 311 determines whether or not the ID acquired in step S52 and the ID acquired in step S53 match each other (step S54). Note that if no discard ID could be acquired in step S53, then the processing unit 311 needs only to determine in step S54 that the IDs do not match each other. If the two IDs do not match each other (no in step S54), the initialization processing unit 325 of the processing unit 311 initializes the counter 314 (step S55). Furthermore, the deletion processing unit 24 of the processing unit 311 deletes the ID stored as a discard ID in the storage unit 33 (step S56), and advances the procedure to step S58.

If the two IDs match each other (Yes in step S54), the processing unit 311 determines whether or not the numeric value stored in the counter 314 exceeds a predetermined number (step S57). If the numeric value stored in the counter 314 does not exceed the predetermined number (No in step S57), or after the ID is deleted from the storage unit 33 in step S56, the determination processing unit 21 of the processing unit 311 acquires authentication information contained in the message at the stage at which the authentication information is output to the communication line 2, and performs determination as to whether or not the acquired authentication information is authorized (step S58) determining whether or not the message that is being transmitted to the communication line 2 is an authorized message (step S59).

If it is determined by the determination processing unit 21 that the message that is being transmitted to the communication line 2 is not an authorized message (No in step S59), the discard processing unit 22 of the processing unit 311 outputs an error frame to the communication line 2 before the transmission of the message is complete (step S60), to cause the ECUs 330 to discard the message. The processing unit 311 stores the ID of the message as a discard ID in the storage unit 13 (step S61). Furthermore, the processing unit 311 increments the value of the counter 314 by 1 (step S62), and ends the procedure.

If the numeric value of the counter 314 exceeds the predetermined number (Yes in step S57), or if it is determined by the determination processing unit 21 that the message that is being transmitted to the communication line 2 is an authorized message (Yes in step S59), then the notification processing unit 23 of the processing unit 311 outputs an ACK to the communication line 2 (step S63) to give a notification that the message reception is complete. The processing unit 311 deletes the ID stored as a discard ID in the storage unit 13 (step S64). Furthermore, the processing unit 311 initializes the counter 314 (step S65), and ends the procedure.

Figure 9:
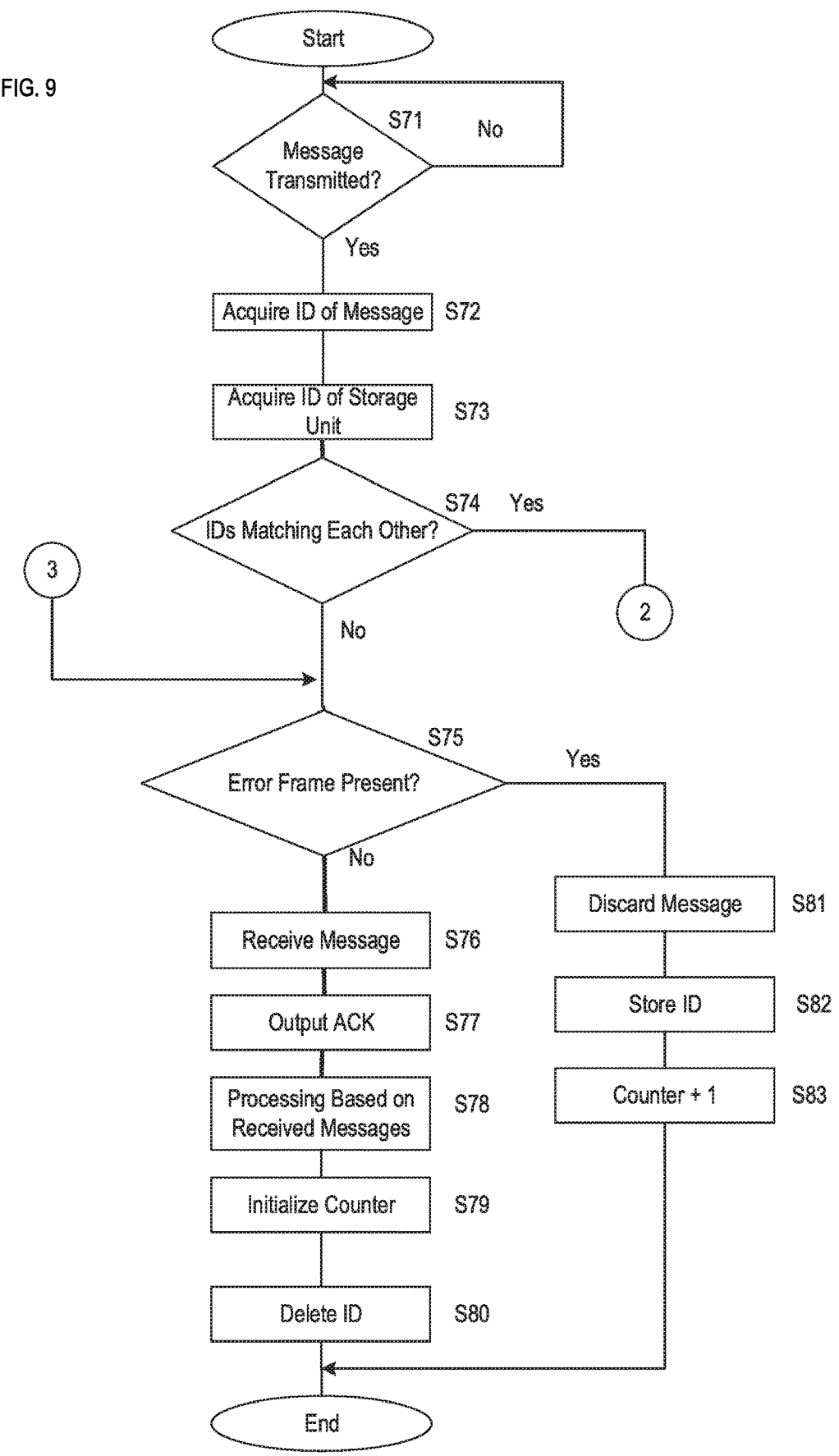
FIG. 9 is a flowchart illustrating a procedure of receiving processing that is performed by each ECU according to Embodiment 2.
Figure 10:
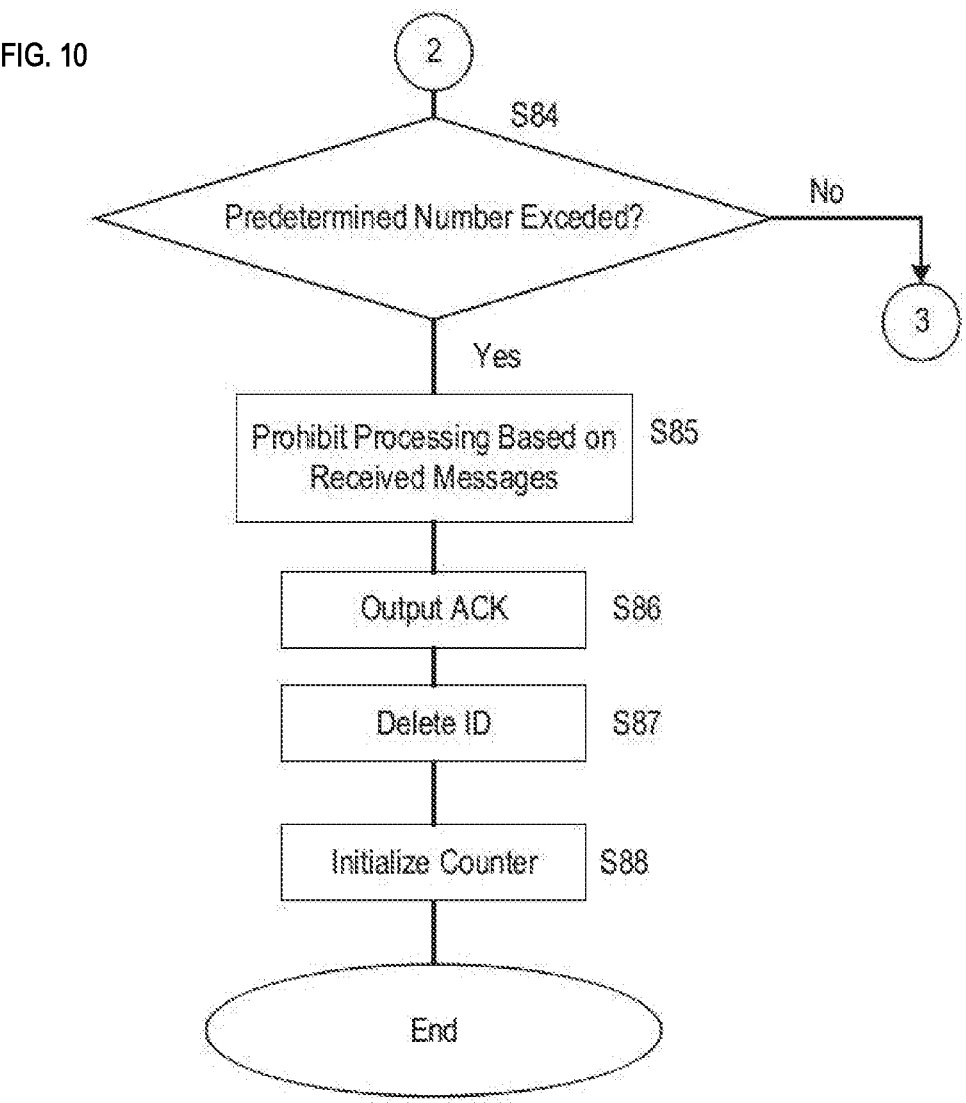
FIG. 10 is a flowchart illustrating the procedure of the receiving processing that is performed by each ECU according to Embodiment 2.

FIGS. 9 and 10 are flowcharts illustrating a procedure of receiving processing that is performed by each of the ECUs 330 according to Embodiment 2. The processing unit 331 of an ECU 330 according to Embodiment 2 determines whether or not a message has been transmitted by another ECU 330 to the communication line 2 (step S71). If no message has been transmitted (No in step S71), the processing unit 331 stands by until a message is transmitted by another ECU 330. If a message has been transmitted by another ECU 330 (Yes in step S71), the processing unit 331 acquires the ID of the message at the stage at which the ID of the message is output to the communication line 2 (step S72). The processing unit 331 also acquires the ID stored as a discard ID in the storage unit 33 (step S73). Note here that the processing unit 331 does not need to acquire an ID if no discard ID is stored in the storage unit 33.

The processing unit 331 determines whether or not the ID acquired in step S72 and the ID acquired in step S73 match each other (step S74). Note that if no discard ID could be acquired in step S73, then the processing unit 331 needs only to determine in step S74 that the IDs do not match each other. If the two IDs do not match each other (No in step S74), then the processing unit 331 determines whether or not an error frame has been received before the transmission of the message is complete (step S75). If no error frame has been received (No in step S75), then the processing unit 331 receives the message output to the communication line 2 (step S76). The processing unit 331 outputs an ACK to the communication line 2 (step S77) to give a notification that the message reception is complete. The processing unit 331 performs processing based on the received message (step S78). Furthermore, the processing unit 331 initializes the counter 334 (step S79), deletes the ID stored as a discard ID in the storage unit 33 (step S80), and ends the procedure.

If an error frame has been received before the transmission of the message on the communication line 2 is complete (Yes in step S75), the processing unit 331 interrupts the processing for receiving this message, and discards the message (step S81). Furthermore, the processing unit 331 stores the ID of this message as a discard ID in the storage unit 33 (step S82), increments the value of the counter 334 by 1 (step S83), and ends the procedure.

Furthermore, if the ID acquired in step S72 and the acquired in step S73 match each other (Yes in step S74), the processing unit 331 determines whether or not the numeric value stored in the counter 334 exceeds a predetermined number (step S84). If the numeric value of the counter 334 does not exceed the predetermined number (No in step S84), the processing unit 331 advances the processing to step S75. If the numeric value of the counter 334 exceeds the predetermined number (Yes in step S84), the prohibition processing unit 41 of the processing unit 331 prohibits processing based on the received message (step S85). The processing unit 331 outputs an ACK to the communication line 2 (step S86) to give a notification that the message reception is complete. Then, the processing unit 331 deletes the ID stored as a discard ID in the storage unit 33 (step S87), initializes the counter 334 (step S88), and ends the procedure.

The on-board communication system according to Embodiment 2 having the above-described configuration is a system in which a plurality of ECUs 330 are connected to each other via a common communication line 2 and that is configured to be provided with the monitoring device 310 including: the determination processing unit 21 that determines whether or not a message is authorized; the discard processing unit 22 that discards an authorized message before transmission of the message is complete; the counter 314 that counts the number of times when the message is discarded; and the notification processing unit 23 that outputs an ACK signal if the numeric value stored in the counter exceeds a predetermined number. The discard processing unit 22 does not discard a message if the numeric value of the counter 314 exceeds the predetermined number. Furthermore, each of the ECUs 330 includes the counter 334 that counts the number of times when a message is discarded by the monitoring device 310, and if the numeric value of the counter 334 exceeds the predetermined number, then processing based on the received message is prohibited and disabled.

In other words, in the on-board communication system according to Embodiment 2, an unauthorized message, if transmitted a predetermined number of times or less, is discarded by the discard processing unit 22, and the number of times when the message is discarded is counted by the counter 314 and the counter 334. If, for example, an unauthorized ECU repeatedly retransmits the unauthorized message regardless of the discarding of the discard processing unit 22, and the number of times of discard exceeds a predetermined number, then the notification processing unit 23 of the monitoring device 310 outputs an ACK signal, but in each of the ECUs 330, processing based on this unauthorized message is prohibited and thus disabled. As a result of the ACK signal indicating completion of reception being output, the unauthorized ECU that has transmitted the unauthorized message determines that the unauthorized message has been received by the ECUs 330, and thus the unauthorized message is no longer retransmitted.

Furthermore, the monitoring device 310 is provided with the storage unit 13 that stores the ID added to a message discarded by the discard processing unit 22, and initializes the counter 314 when a message with an ID different from the ID stored in the storage unit 13 has been transmitted to the communication line 2. Similarly, each of the ECUs 330 is provided with the storage unit 33 that stores the ID added to a message subjected to the discard processing by the monitoring device 310, and initializes the counter 334 when a message with an ID different from the ID stored in the storage unit 33 has been transmitted. This enables the counters 314 and 334 to count the number of times only if messages with the same ID are successively transmitted.

Furthermore, the counters 314 and 334 are initialized when an ACK signal is output by the notification processing unit 23 of the monitoring device 310. Accordingly, it is possible to prevent a situation where processing based on an authorized message is continuously prevented from being prohibited in the ECUs 330.

Note that Embodiment 2 has a configuration in which the monitoring device 310, which performs the respective processes of the determination processing unit 21, the discard processing unit 22, the notification processing unit 23, the deletion processing unit 24, and the initialization processing unit 325, is provided separate from the ECUs 330, but the present invention is not limited to this. For example, a configuration is also possible in which, similar to the configuration shown in Modification 1 of Embodiment 1, the processes of the determination processing unit 21, the discard processing unit 22, the notification processing unit 23, the deletion processing unit 24, and the initialization processing unit 325 are performed by each of the ECUs 330.

Moreover, other configurations of the on-board communication system according to Embodiment 2 are the same as those of the on-board communication system according to Embodiment 1, and thus the same reference numerals are given to the same components, and detailed description thereof is omitted.

The invention claimed is:

1. An on-board communication system in which a plurality of communication devices installed in a vehicle are connected to each other via a common communication line, comprising:
   a monitoring device connected to the communication line and configured to monitor messages transmitted and received between the plurality of communication devices;
   a determination processing unit configured to determine whether or not a message transmitted on the communication line is an authorized message;
   a discard processing unit configured to perform processing for discarding any message determined by the determination processing unit not to be an authorized message, before the transmission of the message is complete;
   a storage unit configured to store identification information of any message that has been discarded by the discard processing unit; and
   a reception completion notification unit configured to output to the communication line, if a message with the same identification information as that stored in the storage unit is received, a signal indicating that reception of the message is complete irrespective of a determination result of the determination processing unit,
   wherein the monitoring device includes the determination processing unit, the discard processing unit, the storage unit and the reception completion unit, and wherein the communication devices each include a prohibition unit configured to prohibit processing based on any message with the same identification information as that stored in the storage unit, and the discard processing unit does not discard messages with the same identification information as that stored in the storage unit.

2. The on-board communication system according to claim 1, further comprising:

a memory deletion unit of the monitoring device configured to delete the identification information stored in the storage unit if the signal is output by the reception completion notification unit.

3. The on-board communication system according to claim 1,
wherein the monitoring device is a gateway device that is connected to a plurality of communication lines, and is configured to relay a message between the communication lines.

4. An on-board communication system in which a plurality of communication device installed in a vehicle are connected to each other via a common communication line, comprising:
a monitoring device connected to the communication line and configured to monitor messages transmitted and received between the plurality of communication devices;
a determination processing unit configured to determine whether or not a message transmitted on the communication line is an authorized message;
a discard processing unit configured to perform processing for discarding any message determined by the determination processing unit not to be an authorized message, before the transmission of the message is complete;
a counter configured to count the number of times when the message is discarded by the discard processing unit; and
a reception completion notification unit configured to output to the communication line, if the number of times counted by the counter exceeds a predetermined number of times, a signal indicating that reception of the message is complete irrespective of a determination result of the determination processing unit,
wherein the monitoring device includes the determination processing unit, the discard processing unit, the storage unit and the reception completion unit, and wherein the communication devices each include a prohibition unit configured to prohibit processing based on any received message if the number of times counted by the counter exceeds the predetermined number of times, and the discard processing unit does not discard the message if the number of times counted by the counter exceeds the predetermined number of times.

5. The on-board communication system according to claim 4, further comprising:
a storage unit disposed in the monitoring device and configured to store, if a message is discarded by the discard processing unit, identification information of the discarded message; and
an initialization unit of the monitoring device configured to initialize the counter if a message with identification information different from the identification information stored in the storage unit is transmitted to the communication line.

6. The on-board communication system according to claim 5, further comprising:
an initialization unit of the monitoring device configured to initialize the counter if the signal is output by the reception completion notification unit.

7. The on-board communication system according to claim 4, further comprising:
an initialization unit of the monitoring device configured to initialize the counter if the signal is output by the reception completion notification unit.

8. The on-board communication system according to claim 4,
wherein the monitoring device is a gateway device that is connected to a plurality of communication lines, and is configured to relay a message between the communication lines.

9. An on-board communication system in which a plurality of communication devices installed in a vehicle are connected to each other via a common communication line, comprising:
a determination processing unit configured to determine whether or not a message transmitted on the communication line is an authorized message;
a discard processing unit configured to perform processing for discarding any message determined by the determination processing unit not to be an authorized message, before the transmission of the message is complete;
a storage unit configured to store identification information of any message that has been discarded by the discard processing unit; and
a reception completion notification unit configured to output to the communication line, if a message with the same identification information as that stored in the storage unit is received, a signal indicating that reception of the message is complete irrespective of a determination result of the determination processing unit,
wherein each communication device of the plurality of communication devices includes the determination processing unit, the discard processing unit, the storage unit, the reception completion unit and a prohibition unit, and wherein the prohibition unit is configured to prohibit processing based on any message with the same identification information as that stored in the storage unit, and the discard processing unit does not discard messages with the same identification information as that stored in the storage unit.

* * * * *